US010907277B2

(12) United States Patent
Park (10) Patent No.: US 10,907,277 B2
(45) Date of Patent: Feb. 2, 2021

(54) THERMOPLASTIC POLYURETHANE YARN

(71) Applicant: Heedae Park, Busan (KR)

(72) Inventor: Heedae Park, Busan (KR)

( * ) Notice: Subject to any disclaimer, the term of this patent is extended or adjusted under 35 U.S.C. 154(b) by 105 days.

(21) Appl. No.: 16/415,072

(22) Filed: May 17, 2019

(65) Prior Publication Data

US 2020/0270773 A1   Aug. 27, 2020

(30) Foreign Application Priority Data

Feb. 25, 2019   (KR) ................. 10-2019-0022018

(51) Int. Cl.
| | |
|---|---|
| *D01F 1/10* | (2006.01) |
| *C08J 3/22* | (2006.01) |
| *C08K 3/36* | (2006.01) |
| *C08K 9/06* | (2006.01) |
| *D01F 6/70* | (2006.01) |

(52) U.S. Cl.
CPC ............. *D01F 1/10* (2013.01); *C08J 3/22* (2013.01); *C08K 3/36* (2013.01); *C08K 9/06* (2013.01); *D01F 6/70* (2013.01); *C08J 2375/04* (2013.01); *C08K 2201/005* (2013.01); *C08K 2201/011* (2013.01)

(58) Field of Classification Search
CPC ..... D01F 6/70; C08K 3/36; C08K 9/06; C08J 3/22
See application file for complete search history.

(56) References Cited

U.S. PATENT DOCUMENTS

| 2004/0014839 A1* | 1/2004 | Bornal ................ C08K 3/01 523/201 |
| 2007/0196650 A1* | 8/2007 | Yamamoto ............ D01F 1/10 428/375 |
| 2018/0100050 A1 | 4/2018 | Park |

FOREIGN PATENT DOCUMENTS

| CN | 1831216 A | 9/2006 |
| EP | 1 722 015 B1 | 11/2006 |
| JP | S60239519 A | 11/1985 |
| KR | 10-1341054 B1 | 12/2013 |
| KR | 10-1341055 B1 | 12/2013 |
| KR | 10-2018-0102030 A | 9/2018 |
| WO | 2017208238 A1 | 12/2017 |

OTHER PUBLICATIONS

"Fumed silica/polyurethane nanocomposites: effect of silica concentration and its surface modification on rheology and mechanical properties" to Hassanajili et al. Iran Polym J (2016) 25:697-710.*

(Continued)

*Primary Examiner* — Michael L Leonard
(74) *Attorney, Agent, or Firm* — Goldilocks Zone IP Law (57) ABSTRACT

The thermoplastic polyurethane yarn of the present invention is excellent in abrasion resistance and durability because it contains thermoplastic polyurethane and nano-silica particles having hydrophobic functional groups on the surface thereof and is excellent in durability of a fine denier yarn, and can have a yarn in a form of continuous yarn without breaking yarn development during spinning or stretching. In particular, it is excellent in color dispersibility, antifouling property, scratch resistance, moldability, and the like.

5 Claims, 3 Drawing Sheets
(3 of 3 Drawing Sheet(s) Filed in Color)

(56) References Cited

OTHER PUBLICATIONS

"Influence of Nanosilica on the Morpho logy, Thermal and Mechanical Properties of Polyurethane Elastomer" to Blagojevic et al. Journal of Applied Polymer Science, vol. 125, E181-E190 (2012).*
The Brazil search report dated Aug. 11, 2020 of the Brazil Patent Application No. BR 102020003521-5, which corresponds to the above-identified application.

* cited by examiner

THERMOPLASTIC POLYURETHANE YARN

CROSS-REFERENCE TO RELATED APPLICATION

This application claims priority to Korean Patent Application No. 10-2019-0022018, filed on Feb. 25, 2019, and all the benefits accruing therefrom under 35 U.S.C. § 119, the contents of which in its entirety are herein incorporated by reference.

TECHNICAL FIELD

The present invention relates to a thermoplastic polyurethane yarn, and more particularly to a thermoplastic polyurethane yarn including thermoplastic polyurethane and nanosilica particles.

BACKGROUND ART

The shoe may include an upper, a midsole, and an outsole. The shoe upper is made of a coated yarn, such as a polyester yarn, a nylon yarn, a PBT yarn, or an acrylic yarn, which are coated with a thermoplastic resin such as polyvinyl chloride or polyurethane on the surfaces thereof to improve durability, abrasion resistance and adhesion has been mainly used (Patent Document 0001, 0002).

However, it is difficult to control an application amount of the thermoplastic resin for coating on a surface of the yarn.

Thus, there is a problem to produce a coated yarn of the thickness of less than 350 denier due to the above difficulty of applying small amount of thermoplastic resin.

Accordingly, there has been proposed a thermoplastic polyurethane yarn (a thermoplastic polyurethane single yarn) in which a thermoplastic resin (in particular, a thermoplastic polyurethane resin) itself is spun without coating a thermoplastic resin on a polyester yarn.

However, thermoplastic polyurethane yarns have a yarn break phenomenon (yarn is broken) in a spinning and drawing process when they are produced on a commercial scale. In particularly, there are problems of high occurrences of yarn breaks when producing fine denier thermoplastic polyurethane yarns.

A method of adding nanosilica particles to a thermoplastic polyurethane to solve the yarn breaking phenomenon has been proposed (Patent Document 0003)

The thermoplastic polyurethane yarn having nanosilica particles could improve an yarn breaking phenomenon, but a shading phenomenon occurred due to insufficient color dispersibility. Such the shading phenomenon is one of the biggest problems of fabric defects because a color difference occurs on the fabric even though the fabric is made of the same manufactured yarns.

In addition, the thermoplastic polyurethane yarn having nano silica has a problem that the antifouling property, the scratch resistance, the molding property, and the like may be lowered. Thus, it is necessary to improve it a more excellent level.

PATENT DOCUMENTS

Patent Document 0001: Registered Patent Publication No. 10-1341054, Title of the Invention: Method of making coating yarn, Date of Publication: Dec. 13, 2013;

Patent Document 0002: Patent Registration No. 10-1341055, Title of the Invention: The method of preparing a thermoplastic polyurethane yarn, Date of Publication: Dec. 13, 2013; and Patent document 0003: Patent Publication No. 10-2018-0102030, title of the invention: Thermochemical polyurethan yarn, Published date: Sep. 14, 2018.

DETAILED DESCRIPTION OF THE INVENTION

Technical Problem to be Solved

An object(s) of embodiments of the present invention is to provide a thermoplastic polyurethane yarn which is obtained in a form of a continuous yarn without a yarn breaking, and which is excellent in color dispersibility, antifouling property, scratch resistance, moldability, and the like.

Technical Solution

The thermoplastic polyurethane yarn may include a thermoplastic polyurethane composition according to an embodiment of the present invention.

The thermoplastic polyurethane composition includes about 0.5 to 7.0 phr of nanosilica particles on a thermoplastic polyurethane basis, and the nanosilica particles may include hydrophobic functional groups on the surface thereof.

The nanosilica particles may have particles sizes of 1 to 100 nm.

The hydrophobic functional group included on the surface of the nanosilica particles may be at least any one of an alkyl group, a dimethyl group, a trimethyl group, a dimethylsiloxane group, and a methacryl group.

The nanosilica particles may form a nanosilica aggregate.

The nanosilica aggregate may have an aggregate size of from 100 to 1200 nm.

The thermoplastic polyurethane may include virgin thermoplastic polyurethane or a mixed thermoplastic polyurethane obtained by mixing virgin thermoplastic polyurethane or virgin thermoplastic polyurethane with thermoplastic polyurethane scrap left after high-frequency work or hot-melt processing.

The thermoplastic polyurethane yarn may be a multifilament yarn having a single yarn of 50 denier/filament or less.

The thermoplastic polyurethane yarn may be a monofilament yarn having 50 to 350 denier.

The method for producing a thermoplastic polyurethane yarn may include a step of dispersing nanosilica particles having a hydrophobic functional group on a surface thereof into at least any one of a polyol, an isocyanate, and a liquid raw material of a low molecular weight glycol according to another embodiment of the present invention.

Polymerizing the liquid raw materials having dispersed nanosilicas to polymerize a resin for the thermoplastic polyurethane yarn, and melt extruding and spinning the resin for the thermoplastic polyurethane yarn.

According to another embodiment of the present invention, there is provided a method of preparing a thermoplastic polyurethane yarn, including: preparing a master batch containing nanosilica particles having hydrophobic functional groups on a surface thereof.

A step of compounding the master batch with a thermoplastic polyurethane base resin to produce a resin for thermoplastic polyurethane yarn, and a step of melt extruding and spinning the resin for thermoplastic polyurethane yarn.

Effects of the Invention

The thermoplastic polyurethane yarn has an abrasion resistance and durability at the level of conventional coated thermoplastic polyurethane yarns and has the advantage that fine denier yarns of 350 denier or less can be obtained in a continuous yarn form without yarn breaking according to aspects of the present invention.

Further, the thermoplastic polyurethane yarn has an excellent effect on color dispersibility, antifouling property, scratch resistance, moldability, and the like according to aspects of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

A surface of polyester yarn or nylon yarn is not coated with a thermoplastic polyurethane resin as in cited reference documents.

By spinning the resin for thermoplastic polyurethane yarn containing 0.5 to 7.0 phr of nanosilica particles having a hydrophobic functional group on their surfaces thereof, yarns having fine deniers, specially, a monofilament yarn of 50 to 350 denier or a multifilament yarn of 50 denier/filament or less can be obtained as a continuous yarn form that does not break.

DETAILED DESCRIPTION OF THE INVENTION

Hereinafter, preferred embodiments of the present invention will be described in detail. The embodiments of the present invention can be modified into various other forms, and the scope of the present invention is not limited to the embodiments described below.

Furthermore, embodiments of the present invention are provided to more fully explain the present invention to those who skilled in the art.

As used herein, "Nano silica particles" means a silica particle of 100 nm or less in which the particle size of the primary particle is smaller than a micro unit.

As used herein, 'Nanosilica particles with hydrophobic functional groups on the surface' means that a functional group having hydrophobicity is introduced into a part or all of the surface of the nanosilica particle.

In general, conventional nanosilica particles have a hydrophilic surface, however, a surface of nanosilica is hydrophobic by introducing hydrophobic functional groups through a specific surface treatment (or surface modification) according to aspects of the present invention.

"nano silica aggregate" used in the present application refers to a state where at least about 70% or more of the primary particles of nano silica are strongly bound together by a physical·chemical method.

An aggregate is composed of several aggregates of primary particles and a distinct concept from an agglomerate which are composed of several aggregates.

It is difficult to further separate the nanosilica aggregates into smaller entities (nanosilica particles).

As used in the present invention, the "thermoplastic polyurethane yarn" used in the present invention refers to a yarn produced by directly spinning a thermoplastic polyurethane itself and distinct from a coated yarn produced by coating a thermoplastic polyurethane resin on the surface of a polyester yarn or the like.

In the present invention, the expression 'continuously producing thermoplastic polyurethane yarn' means that the thermoplastic polyurethane yarn is obtained in a continuous form in the process of producing the thermoplastic polyurethane yarn without a yarn break.

The thermoplastic polyurethane yarn includes silica particles of nano units (100 nm or less) in a particle size not in micro units according to aspects of the present invention.

In a case of using micro silica particles, it is practically impossible to produce a thermoplastic polyurethane yarn in a continuous form due to frequent occurrences of yarn breaking during the spinning or drawing process of a thermoplastic polyurethane yarn.

The thermoplastic polyurethane yarn may include nanosilica particles having a hydrophobic functional group on their surfaces according to an aspect of the present invention.

If hydrophobic functional groups are introduced into the surface of the nanosilica particles, it is confirmed that the yarn breaking, which can be generated by moisture in the processes such as spinning and drawing, is reduced, and the physical properties such as color dispersibility, antifouling property, scratch resistance and molding property are improved.

The thermoplastic polyurethane yarn contains 0.5 to 7.0 phr (parts per hundred resin) of nano-silica particles based on the thermoplastic polyurethane resin according to aspect of the present invention.

If the contents of the nano-silica particles is less than 0.5 phr based on the thermoplastic polyurethane resin, yarn breaking is occured or the surface of the yarn becomes rough during the production of the yarn.

A yarn breaking may occur in a spinning or a drawing process if the content of the nano silica particles exceeds 7.0 phr based on the thermoplastic polyurethane resin.

The thermoplastic polyurethane yarn may include nanosilica particles having a hydrophobic functional group on the surface are contained in an amount of 0.5 to 7.0 phr based on the thermoplastic polyurethane resin, so that the yarn can be economically and effectively mass produced. In addition, the thermoplastic polyurethane yarn is excellent in color dispersibility, antifouling property, scratch resistance and molding property according to aspects of the present invention.

Generally, in order to secure good workability in an economical and effective mass production of yarn in a thermoplastic polyurethane yarn industry, the yarn breaking occurrence rate should generally be maintained at 2% or less.

The yarn may be not smoothly produced because of poor spinning and twisting workability if the yarn breaking occurrence rate is about 2% or more.

The nanosilica particles used in the thermoplastic polyurethane yarn preferably have sizes, diameters of 1 to 100 nm according to an aspect of the present invention.

The size of the nanosilica particles is the primary particle size of the non-aggregated state, and can be measured using a transmission electron microscope or the like.

Yarn breaking may occur in the spinning or drawing process if the size of the nanosilica particles is less than 1 nm or more than 100 nm.

The hydrophobic functional group such as an alkyl group, a dimethyl group, a trimethyl group, a dimethylsiloxane group, a methacryl group, or the like can be introduced on the surface of the nanosilica particles.

For example, the nanosilica particles used in the thermoplastic polyurethane yarn can be obtained by treating the nanosilica obtained by controlling a temperature and/or a pressure in a process of producing fumed silica with an organosilane compound so that the surface of the nanosilica particle contains a dimethyl group according to aspects of the present invention.

The hydrophobic functional group-introduced nanosilica particles preferably have OH group density of 1.0 OH/nm2 or less.

The OH group density can be measured by reacting nanosilica particles having hydrophobic functional groups introduced thereinto with lithium aluminum hydride and measuring the density of the OH groups using IR spectroscopy to determine the molar absorbance of the OH group stretching vibration band in the glass silanol group at 3750 $cm^{-1}$ of the compound.

The nanosilica particles exist in an aggregate state and are dispersed in an aggregate state that is difficult to separate in a thermoplastic polyurethane yarn according to aspect of the present invention.

The aggregates of the nanosilica particles used in the thermoplastic polyurethane yarns have aggregates sizes of from 100 to 1200 nm, preferably from 200 to 500 nm according to aspects of the present invention.

If the size of nanosilica aggregate is more than 100 nm, the nanosilica is dispersed well. However, if it is more than 1200 nm, the thickening effect is not effective, so that a lot of yarn breaking occur in a spinning and/or a drawing process.

A size of the nanosilica aggregate refers to the length of the nanosilica aggregate in a long axis direction, and can be generally measured using a transmission electron microscope or the like.

The thermoplastic polyurethane resin used in the thermoplastic polyurethane yarn may be a virgin thermoplastic polyurethane according to an aspect of the present invention.

The virgin thermoplastic polyurethanes is thermoplastic polyurethanes obtained by polymerizing raw materials such as polyols and isocyanates with low molecular weight glycols as chain extenders.

Examples of the polyols to be used herein may include polyester glycols, polyether glycols, polycaprolactones, and the like. Examples of the isocyanates may include aromatic isocyanates and aliphatic isocyanates. Examples of the low molecular weight glycols include 1,4-butanediol.

The thermoplastic polyurethane resin used in the thermoplastic polyurethane yarn may be a thermoplastic polyurethane obtained by mixing a virgin thermoplastic polyurethane produced as described above with a high-frequency work or a thermoplastic polyurethane scrap left after hot-melt processing according to an aspect of the present invention.

The thermoplastic polyurethane yarn can be obtained in a continuous form of tread without breaking in the production process of spinning or the like. In particularly, the thermoplastic polyurethane yarn can be a fine denier thermoplastic polyurethane yarn according to an aspect of the present invention.

Preferably, the thermoplastic polyurethane yarn may be a multifilament yarn having a monofilament fineness of 50 denier/filament or less or a monofilament yarn having a fineness of 50 to 350 denier according to an aspect of the present invention.

Nanosilica particles can be evenly distributed in a thermoplastic polyurethane yarn, in particular, hydrophobic functional groups of the nanosilica particles contribute to improve of antifouling property and scratch resistance of thermoplastic polyurethane yarn but also directly improve of color dispersibility and moldability by suppressing the yarn breaking that can be generated by water in a spinning or a drawing process according to aspects of the present invention.

There are two methods for producing the thermoplastic polyurethane yarn of the present invention.

One is producing using a resin for thermoplastic polyurethane yarn which is obtained by inputting nanosilica into a polymerization raw material of a thermoplastic polyurethane resin and polymerizing the thermoplastic polyurethane yarn with a certain amount of nanosilica urethane resin.

The other is, instead of inputting the nanosilica into a polymerization raw material of the thermoplastic polyurethane resin, inputting the nanosilica into the polymerized thermoplastic polyurethane resin to prepare a master batch, and producing a resin for thermoplastic polyurethane yarn using the master batch and a thermoplastic polyurethane base resin.

The first manufacturing method may include a step of dispersing nanosilica particles having hydrophobic functional groups on a surface of at least any one of polyol, isocyanate, and low molecular weight glycol liquid raw materials, polymerizing liquid raw materials in which nanosilica particles are dispersed to polymerize a resin for a thermoplastic polyurethane yarn, and melt-extruding and twisting the resin for the thermoplastic polyurethane yarn.

Specifically, a nanosilica particle having a hydrophobic functional group is added to at least any one of a polyol, an isocyanate, and a low molecular weight glycol and sufficiently stirred to prepare a liquid raw material. The liquid raw material is polymerized in a reactor to produce a resin for thermoplastic polyurethane yarn. Then, the thermoplastic polyurethane yarn can be produced by melt spinning the obtained resin for thermoplastic polyurethane yarn according to aspects of the present invention.

At this time, the nanosilica particles are added so as to have a content of 0.5 to 7.0 phr based on the thermoplastic polyurethane resin.

The second method may include preparing a masterbatch having nanosilica particles having hydrophobic functional groups on surfaces thereof, preparing a resin for thermoplastic polyurethane yarn by compounding the masterbatch with a thermoplastic polyurethane base resin, and a step of melt-extruding and spinning the resin for the thermoplastic polyurethane yarn.

Specifically, first, a nanosilica particle having a hydrophobic functional group on its surface is concentrated and compounded with a thermoplastic polyurethane resin to prepare a master batch containing nanosilica particles, and the master batch is introduced into a thermoplastic polyurethane base resin and compounded to produce a resin for thermoplastic polyurethane yarn, and then a thermoplastic polyurethane yarn can be produced by melt spinning the resin for thermoplastic polyurethane yarn according to aspects of the present invention.

At this time, the content of the nano-silica particles contained in the master batch is preferably 40% by weight or less, more preferably about 30% by weight. At this time, the content of the master batch compounded is adjusted so that the content of the nanosilica particles is 0.5 to 7.0 phr based on the final thermoplastic polyurethane resin.

Hereinafter, the thermoplastic polyurethane yarn of the present invention will be specifically described by way of examples. However, it should be understood that the scope of the present invention is not limited by the embodiments.

Experimental Example 1: Processability of Thermoplastic Polyurethane Yarn

Examples 1 to 14

1. Production of a Resin for Thermoplastic Polyurethane Yarn

A polyol, an isocyanate, and a low molecular weight glycol are prepared as a liquid raw material for use in a usual thermoplastic polyurethane resin polymerization, and a nano-carrier having a particle size of 100 nm or less is treated with dimethyldichlorosilane to have an average primary particle size of about 20 nm, a nanosilica particle containing a dimethyl group as a hydrophobic functional group on the surface thereof was prepared.

The above nanosilica particles were added to a polyol as a liquid raw material at a constant weight ratio and kneaded at a temperature of 80 to 100° C. at a speed of 20 to 30 rpm.

A polyol with sufficiently dispersed nanosilica particles, isocyanate, and low molecular weight glycol were simultaneously inputted into a reactor and polymerized to obtain a polymer.

The obtained polymer was dried and cut to prepare a resin for a thermoplastic polyurethane yarn in forms of pellets.

2. Production of Thermoplastic Polyurethane Yarn

A. Production of Multifilament Yarn (150 Denier/24 Filaments)

The above pelletized thermoplastic polyurethane raw resin was put into a spinning extruder and melt extruded at a temperature of 150 to 250° C. (operating speed: 3000 m/min).

The yarn coming out through the dies of the extruder was air-cooled to 25 to 40° C. while being collected by the number of filaments (24 filaments).

The obtained yarn was drawn, and the drawn yarn was wound.

Production of Monofilament Yarn (150 Denier)

The above pelletized resin for thermoplastic polyurethane yarn was inputted into a spinning extruder and melt extruded at a temperature of 150 to 230° C. (operating speed: 200 m/min)

The yarn coming out through the dies of the extruder was water cooled to 25 to 40° C.

The obtained yarn was stretched, and the stretched yarn was aged in a normal heater chamber, and then the yarn was wound.

Comparative Examples 1 to 8

A thermoplastic polyurethane yarn was prepared in the same manner as in Examples 1 to 14 except that the content of nano-silica was varied.

Evaluation

The viscosity change, extrusion processability and surface state of the thermoplastic polyurethane yarns of Examples 1 to 14 and Comparative Examples 1 to 8 were evaluated according to the content of the nano silica contained in the thermoplastic polyurethane yarn, and the results are shown in Table 1 below (If the normal yarn breaking ccurrence rate is 2% or less, the work is regarded as a good work).

TABLE 1

| classification | MI (200° C., 2.16 kg, g/10 min) | Nano silica Content (phr) | Extrusion processability and surface state of thermoplastic polyurethane yarn | |
|---|---|---|---|---|
| | | | Multifilament yarn (150 d/24 f) | monofilament yarn (150 d) |
| Comparative Example 1 | 44.6 | 0 | Unable to work (80% of Yarn break) | Unable to work (70% of yarn break) Rough Surface |
| Comparative Example 2 | 40.9 | 0.3 | Unable to work (30% of yarn break) | Unable to work (24% of yarn break) rough Surface |
| Example 1 | 42.8 | 0.5 | Good work (2% of yarn break) | Good work (2% of yarn break) Good surface |
| Example 2 | 42.3 | 1.0 | Good work (no Yarn break) | Good work (no Yarn break) Good surface |
| Example 3 | 43.6 | 1.5 | Good work (no Yarn break) | Good work (no yarn break) Good surface |
| Example 4 | 48.1 | 2.0 | Good work (no Yarn break) | Good work (no Yarn break) Good surface |
| Example 5 | 42.4 | 2.5 | Good work (no Yarn break) | Good work (no Yarn break) Good surface |
| Example 6 | 46.3 | 3.0 | Good work (1% of Yarn break) | Good work (no Yarn break) Good surface |

TABLE 1-continued

| classification | MI (200° C., 2.16 kg, g/10 min) | Nano silica Content (phr) | Extrusion processability and surface state of thermoplastic polyurethane yarn | |
|---|---|---|---|---|
| | | | Multifilament yarn (150 d/24 f) | monofilament yarn (150 d) |
| Example 7 | 42.1 | 3.5 | Good work no yarn break | Good work (no Yarn break) Good surface |
| Example 8 | 43.5 | 4.0 | Good work no Yarn break | Good work no Yarn break Good surface |
| Example 9 | 37.5 | 4.5 | Good work (1% of Yarn break) | Good work (no Yarn break) Good surface |
| Example 10 | 41.2 | 5.0 | Good work (no Yarn break) | Good work (2% of Yarn break) Good surface |
| Example 11 | 36.2 | 5.5 | Good work (no yarn break) | Good work (no yarn break) Good surface |
| Example 12 | 33.1 | 6.0 | Good work (1% of Yarn break) | Good work (2% of Yarn break) Good surface |
| Example 13 | 36.4 | 6.5 | Good work (2% of Yarn break) | Good work (0% of Yarn break) Good surface |
| Example 14 | 39.3 | 7.0 | Good work (1% of yarn break) | Good work (2% of yarn break) Good surface |
| Comparative Example 3 | 39.6 | 7.5 | Workability deterioration (20% of yarn break) | Workability deterioration (16% of yarn break) |
| Comparative Example 4 | 41.1 | 8.0 | Workability deterioration (30% of yarn break) | Workability deterioration (24% of yarn break) |
| Comparative Example 5 | 38.4 | 8.5 | Workability deterioration (38% of yarn break) | Workability deterioration (32% of yarn break) |
| Comparative Example 6 | 38.7 | 9.0 | Workability deterioration (56% of yarn break) | Workability deterioration (44% of yarn break) |
| Comparative Example 7 | 41.5 | 9.5 | Workability deterioration (63% of yarn break) | Workability deterioration (54% of yarn break) |
| Comparative Example 8 | 38.8 | 10.0 | Workability deterioration (70% of yarn break) | Workability deterioration (66% of yarn break) |

According to the above Table 1, the thermoplastic polyurethane yarn containing no nanosilica particles or containing about 0.3 phr was too much flowed out during extrusion. Thus, the yarn break rate was so high that the spinning operation was impossible (the occurrence frequency of yarn breaks was about 24~80%) and the surface of the thermoplastic polyurethane yarn was also roughened (Comparative Examples 1 and 2).

The thermoplastic polyurethane yarn containing 0.5 to 7.0 phr of nanosilica particles exhibited excellent spinning and stretchability (workability) without yarn break when extrusion (yarn break occurrence rate of 2% or less) and good yarn surface (Example 1 To 14).

Figure 1:
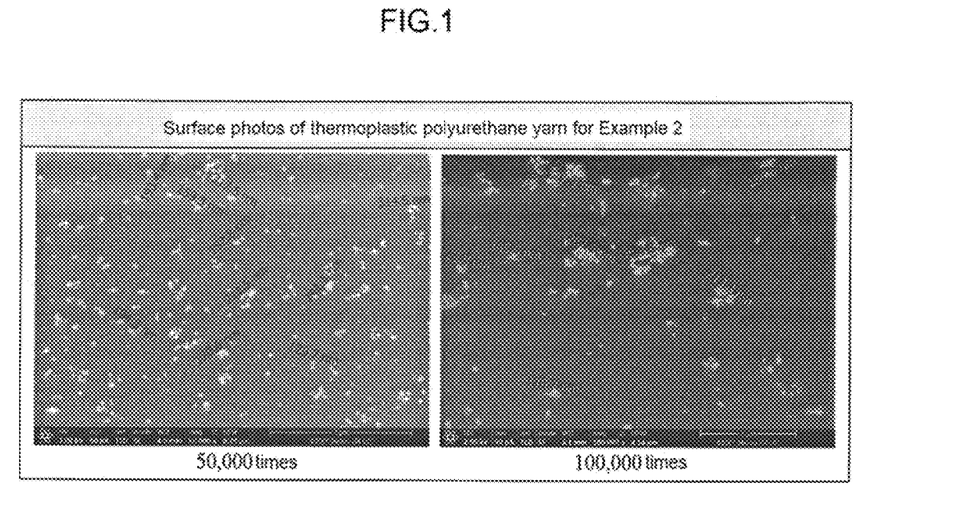
FIG. 1 is a SEM photograph of the surface of a thermoplastic polyurethane yarn of Example 2 according to aspects of the present invention.

The SEM photograph of the surface of the thermoplastic polyurethane yarn of Example 2 is shown in FIG. 1, it is confirmed that nanosilica particles (about 20 nm) are well dispersed in a nanosilica aggregate state (100 to 600 nm) in the thermoplastic polyurethane yarn.

The thermoplastic polyurethane yarn containing 7.5% phr or more of nano silica had a problem of poor workability due to frequent occurrences of yarn breaks during extrusion (Comparative Examples 3 to 8).

From these test results, it can be seen that the thermoplastic polyurethane yarn of the present invention containing 0.5 to 7.0 phr of nanosilica particles having hydrophobic functional groups introduced into its surface can be obtained in a fine denier form without yarn breaks development.

Experimental Example 2: Processability of Thermoplastic Polyurethane Yarn (Using Master Batch)

Examples 15 to 28

1. Preparation of Masterbatch and Preparation of Thermoplastic Polyurethane Yarn Nano silica particles of 100 nm or less were treated with dimethyldichlorosilane to prepare nanosilica particles having an average particle size of about 20 nm and a dimethyl group as a hydrophobic functional group on the surface.

The above nanosilica particles and thermoplastic polyurethane resin were put into a kneader at a constant weight ratio and kneaded at a temperature of 100 to 120° C. at a speed of 20 to 30 rpm. At this time, the content of the nanosilica particles was about 30% by weight based on the final master batch.

The above kneaded product (compound) was cooled, pulverized to a diameter of 10 nm or less, and then put into a conventional twin-screw extruder. At this time, the temperature of the biaxial extruder was 150 to 200° C.

The masterbatch compounded in a twin-screw extruder was inputted into cooling water at 15 to 20° C. to form pellets, followed by drying and aging.

A resin for the thermoplastic polyurethane yarn was obtained by compounding the master batch prepared as described above and with a conventional thermoplastic polyurethane base resin at a constant weight ratio.

2. Manufacture of Thermoplastic Polyurethane Yarn

A. Manufacture of Multifilament Yarn (150 Denier/24 Filaments)

The above-mentioned thermoplastic polyurethane raw resin was put into a spinning extruder and melt extruded at a temperature of 150 to 250° C. (operating speed: 3000 m/min).

The yarn coming out through the dies of the extruder was collected by the number of filaments (24 filaments) and air-cooled at 25 to 40° C.

The obtained yarn was stretched, and the stretched yarn was wound.

B. Production of Monofilament Yarn (150 Denier)

The above-mentioned thermoplastic polyurethane raw resin was put into a spinning extruder and melt extruded at a temperature of 150 to 230° C. (work speed: 200 m/min).

The yarn coming out through the die of the extruder (not shown) was water cooled to 25 to 40° C.

The obtained yarn was drawn, and the drawn yarn was aged in a normal heater chamber, and then the yarn was wound.

Comparative Examples 9 to 16

Thermoplastic polyurethane yarns were prepared in the same manners as in Examples 15 to 28 except that the contents of nano silicas were varied.

Evaluation

The viscosity change, extrusion processability and surface condition of the thermoplastic polyurethane yarns of Examples 15 to 28 and Comparative Examples 9 to 16 were evaluated according to the content of the nanosilica contained in the thermoplastic polyurethane yarns, and the results are shown in Table 2 below (in general, a case where a yarn break occurrence rate is 2% or less, the work is regarded as good).

TABLE 2

| classification | MI (200° C., 2.16 kg, g/10 min) | Nano silica by master batch injection Content (phr) | Extrusion processability and surface state of thermoplastic polyurethane yarn | |
|---|---|---|---|---|
| | | | Multifilament yarn (150 d/24 f) | monofilament yarn (150 d) |
| Comparative Example 9 | 44.6 | 0 | Unable to work (80% of Yarn break) | Unable to work (70% of Yarn break) Rough Surface |
| Comparative Example 10 | 42.6 | 0.3 | Unable to work (37% of Yarn break) | Unable to work (26% of Yarn break) Rough Surface |
| Example 15 | 39.4 | 0.5 | Good work (2% of Yarn break) | Good work (2% of Yarn break) Good surface |
| Example 16 | 38.6 | 1.0 | Good work (no Yarn break) | Good work (no Yarn break) Good surface |
| Example 17 | 40.1 | 1.5 | Good work (no Yarn break) | Good work (no Yarn break) Good surface |
| Example 18 | 37.5 | 2.0 | Good work (no Yarn break) | Good work (no Yarn break) Good surface |
| Example 19 | 39.7 | 2.5 | Good work (1% of Yarn break) | Good work (no Yarn break) Good surface |
| Example 20 | 43.2 | 3.0 | Good work (1% of Yarn break) | Good work (no Yarn break) Good surface |
| Example 21 | 44.4 | 3.5 | Good work (no Yarn break) | Good work (no Yarn break)) Good surface |
| Example 22 | 39.5 | 4.0 | Good work (1% of Yarn break) | Good work (2% Yarn break) Good surface |
| Example 23 | 40.6 | 4.5 | Good work (no Yarn break) | Good work (no Yarn break) Good surface |
| Example 24 | 40.9 | 5.0 | Good work (no Yarn break) | Good work (2% of Yarn break) Good surface |
| Example 25 | 38.9 | 5.5 | Good work (1% of Yarn break) | Good work (0% of Yarn break) Good surface |
| Example 26 | 39.4 | 6.0 | Good work (no Yarn break) | Good work (no Yarn break) Good surface |
| Example 27 | 37.6 | 6.5 | Good work (1% of Yarn break) | Good work (2% of Yarn break) Good surface |
| Example 28 | 40.2 | 7.0 | Good work (1% of Yarn break) | Good work (2% of Yarn break) Good surface |

TABLE 2-continued

| classification | MI (200° C., 2.16 kg, g/10 min) | Nano silica by master batch injection Content (phr) | Extrusion processability and surface state of thermoplastic polyurethane yarn | |
|---|---|---|---|---|
| | | | Multifilament yarn (150 d/24 f) | monofilament yarn (150 d) |
| Comparative Example 11 | 37.2 | 7.5 | Workability Drop (13% of yarn break) | Workability Drop (10% of yarn break) |
| Comparative Example 12 | 39.1 | 8.0 | Workability deterioration (29% of yarn break) | Workability deterioration (26% of yarn break) |
| Comparative Example 13 | 41.5 | 8.5 | Workability deterioration (41% of yarn break) | Workability deterioration (34% of yarn break) |
| Comparative Example 14 | 40.7 | 9.0 | Workability deterioration (58% of yarn break) | Workability deterioration (48% of yarn break) |
| Comparative Example 15 | 42.8 | 9.5 | Workability deterioration (63% of yarn break) | Workability deterioration (58% of yarn break) |
| Comparative Example 16 | 43.3 | 10.0 | Workability deterioration (75% of yarn break) | Workability deterioration (68% of yarn break) |

According to the above Table 2, high occurrences of yarn breaks if the thermoplastic polyurethane yarns containing no nanosilica particles or containing about 0.3 phr of nanosilica particles due to too much flowed out during extrusion and the yarn production was impossible (the frequency of yarn break occurrence was about 26% to 80%, and the surfaces of the thermoplastic polyurethane yarns were also roughened (Comparative Examples 9 to 10).

The thermoplastic polyurethane yarns containing 0.5 to 7.0 phr of nanosilica particles exhibited excellent spinning and stretchability without yarn break when extrusion (yarn break occurrence rate of 2% or less) and good yarn surface (Examples 15 to 28).

The thermoplastic polyurethane yarns having the nano silica content of 7.5 phr or more had problems in that yarn breaks were frequently generated during the extrusion, resulting in poor workability (Comparative Examples 11 to 16).

From these test results, it was proved that the thermoplastic polyurethane yarn (in which the nanosilica content is 0.5 to 7.0 phr) containing nanosilica particles having hydrophobic functional groups introduced on the surfaces thereof in a master batch form can be obtained according to aspects of the present invention.

Experimental Example 3: Color Dispersion, Antifouling Property, Scratch Resistance, Molding Property of Thermoplastic Polyurethane Yarn Example 29

A thermoplastic polyurethane fabric was made using a thermoplastic polyurethane yarn comprising nanosilica particles with hydrophobic functional groups of the invention of Example 2.

These fabrics were evaluated for color dispersibility (visua comparative evaluation after dyeing with 0.2 phr of blue pigment), antifouling (according to ISO 26082-1), scratch resistance (according to ASTM D3886), heating (press 160° C., 60 bar, 80 seconds).

Comparative Example 17

In Example 2, thermoplastic polyurethane yarn were prepared using conventional nanosilica particles instead of the hydrophobic functional group-introduced nanosilica particles.

A thermoplastic polyurethane fabric was made using the thermoplastic polyurethane yarn produced described above.

These fabrics were evaluated for color dispersibility (visual comparative evaluation after dyeing with 0.2 phr of blue pigment), antifouling (according to ISO 26082-1), and scratch resistance (according to ASTM D3886), heating press 160° C., 60 bar, 80 seconds)

Evaluation

The samples of Example 29 and Comparative Example 17 were evaluated for color dispersibility, antifouling property, scratch resistance, and moldability, and they are shown in FIG. 2 to FIG. 5.

Figure 2:
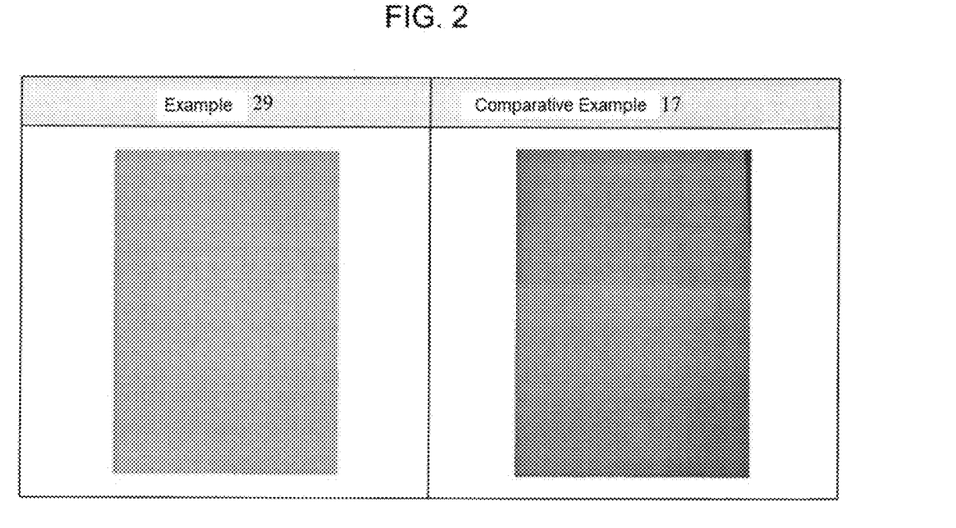
FIG. 2 is a photograph of the color dispersibility of Example 29 according to aspects of the present invention and Comparative Example 17.

Referring to FIG. 2, in Example 29, shading rarely occurs after woven fabric, but in Comparative Example 17, a different color is generated after woven.

In other words, it can be seen that Example 29 is superior in color dispersibility.

Such a shading phenomenon may be seen as a small shading when referring to a yarn, but when the fabric is woven using the yarn, a larger shading is brought about in the color of the fabric, which can cause a problem of fabric defect.

Figure 3:
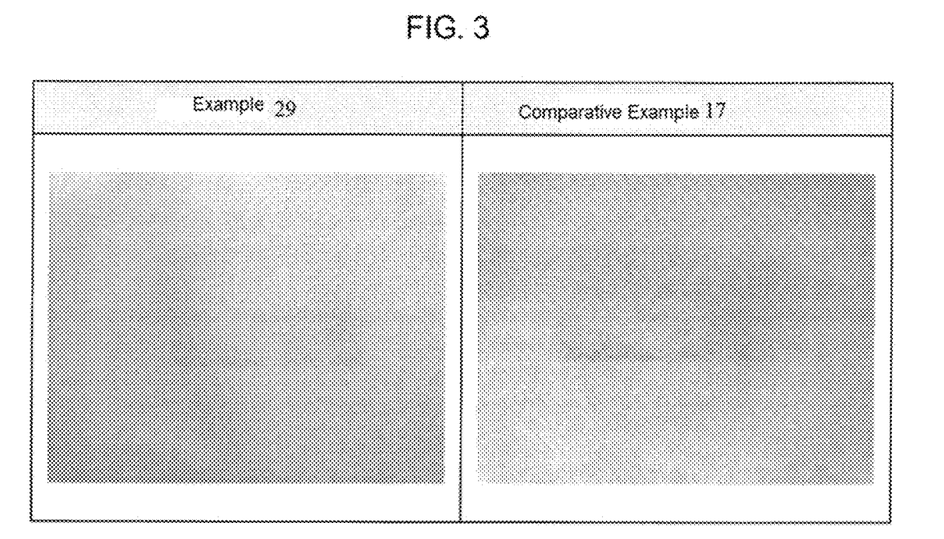
FIG. 3 is a photograph of the antifouling property of Example 29 according to aspects of the present invention and Comparative Example 17.

Referring to FIG. 3, it can be seen that there was almost no contamination in Example 29, but the contamination was severe in Comparative Example 17.

That is, it can be seen that the antifouling property of Example 29 is improved and the contamination resistance is better than that of Comparative Example 17.

Table 3 below also shows that the color difference value of Example 29 is lower than that of Comparative Example 17, so that it is confirmed that soiled fabrics may be not easily contaminated.

TABLE 3

| ISO 26082-1, rubbing tester 500 g load, reciprocating 20 times of soiled fabrics, measurement with colormeter. | | |
|---|---|---|
| | Example 29 | Comparative Example 17 |
| dE | 1.0 | 1.24 |

Figure 4:
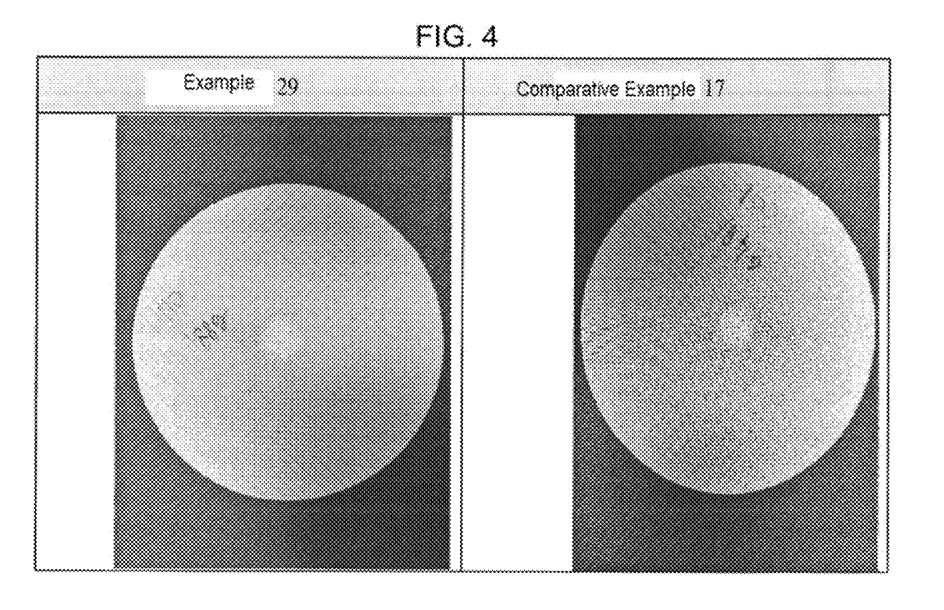
FIG. 4 is a photograph of evaluation of scratch resistance of Example 29 according to aspects of the present invention and Comparative Example 17 of the present invention.

Referring to FIG. 4, it is confirmed that Example 29 is not worn well than that of Comparative Example 17.

That is, Example 29 is superior in scratch resistance to Comparative Example 17.

In Table 4, it can be seen that abrasions cycle of Example 29 (the number of reciporating required for abrasion) is higher than that of Comparative Example 17.

TABLE 4

| ASTM D3886, using a Stoll Abrasion tester | | |
|---|---|---|
| | Example 29 | Comparative Example 17 |
| Number of abrasions | 110 | 100 |

Figure 5:
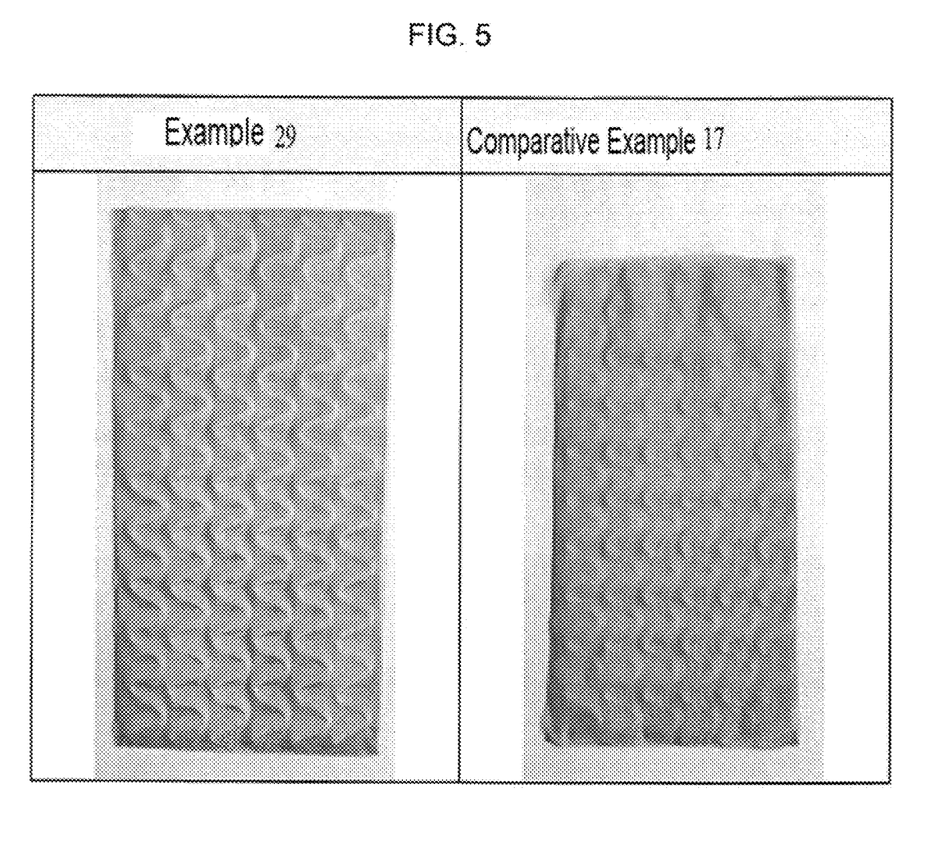
FIG. 5 is a photograph of the moldability of Example 29 according to aspects of the present invention and Comparative Example 17.

Referring to FIG. 5, it can be seen that Example 29 has better moldability than Comparative Example 17, and the shape is clear.

As described above, the thermoplastic polyurethane yarn of the present invention can obtain a yarn of 350 denier or less in a form of a continuous yarn without a yarn break development phenomenon, and particularly excellent in properties such as color dispersibility, antifouling property, scratch resistance and moldability.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A thermoplastic polyurethane yarn comprising a thermoplastic polyurethane composition,
    wherein the thermoplastic polyurethane composition comprises nanosilica particles having a primary particle size of 1 to 100 nm and 0.5 to 7.0 parts per hundred resin (phr) based on a thermoplastic polyurethane;
    wherein the nanosilica particle comprises a hydrophobic functional group on the surface thereof and the nanosilica particles form aggregates of nanosilica particles,
    wherein the nanosilica aggregates have size of 100 to 1200 nm.

2. The thermoplastic polyurethane yarn according to claim 1,
    wherein the hydrophobic functional group contained in the surface of the nanosilica particle is at least any one of an alkyl group, a dimethyl group, a trimethyl group, a dimethylsiloxane group, and a methacryl group.

3. The thermoplastic polyurethane yarn according to claim 1,
    wherein the thermoplastic polyurethane comprises a virgin thermoplastic polyurethane or a thermoplastic polyurethane obtained by mixing thermoplastic polyurethane scrap remaining after high-frequency work or hot-melt processing on the virgin thermoplastic polyurethane.

4. The thermoplastic polyurethane yarn according to claim 1,
    wherein the thermoplastic polyurethane yarn is a multifilament yarn having a single yarn fineness of 50 denier/filament or less.

5. The thermoplastic polyurethane yarn according to claim 1,
    wherein the thermoplastic polyurethane yarn is a monofilament yarn having a fineness of 50 to 350 denier.

* * * * *